United States Patent

[11] 3,591,111

| [72] | Inventor | William G. Spence |
| | | 2372 Wilson Ave., N.D.G., Montreal, Quebec, Canada |
| [21] | Appl. No. | 829,909 |
| [22] | Filed | June 3, 1969 |
| [45] | Patented | July 6, 1971 |

[54] AIRCRAFT LOADING DOOR
4 Claims, 4 Drawing Figs.

[52] U.S. Cl. .................................. 244/137, 244/129
[51] Int. Cl. ..................................... B64c 1/14
[50] Field of Search ........................... 244/118, 137, 129 D; 49/111, 246, 248, 339, 340

[56] References Cited
UNITED STATES PATENTS
2,750,929  6/1956  Bronson .................. 49/111
2,763,900  9/1956  McAfee et al. ............. 244/129 D
3,128,068  4/1964  Pauli ........................ 244/137
3,424,411  1/1969  Blunschi, Sr. et al ....... 244/137

Primary Examiner—Milton Buchler
Assistant Examiner—Steven W. Weinrieb
Attorney—Pierre Lesperance ABSTRACT: An opening mechanism for an inclined aircraft door including an angular member pivoted to the aircraft fuselage and to the door inwardly of the door edge, so that power pivoting of the angular member causes pivoting opening movement of the door about an edge remote from said member until the door abuts the angular member and further pivoting of said member causes the latter and the door to move as a unit. The mechanism allows the door to fully clear the door opening and serves also to lock the door in closed position.

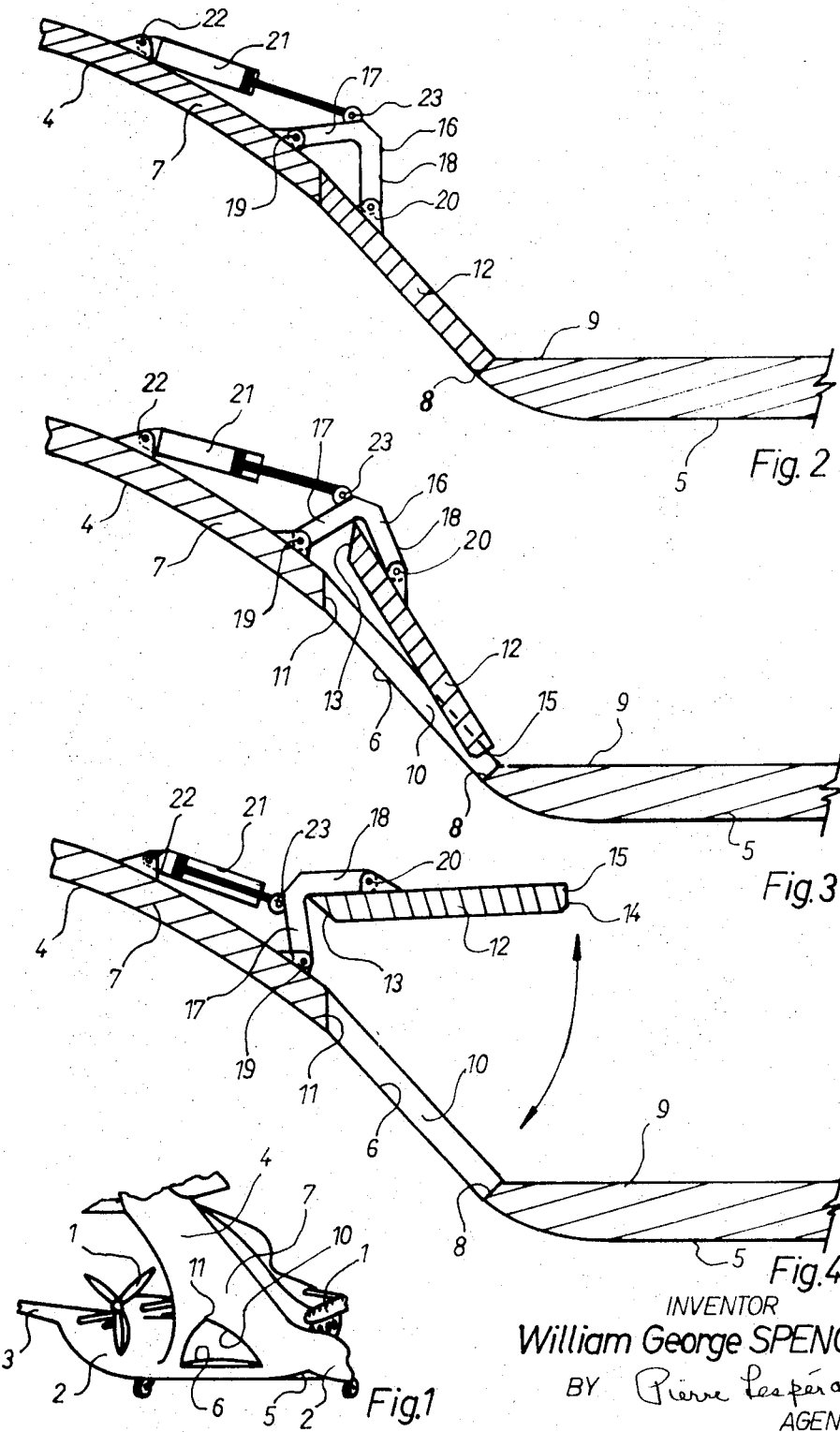

AIRCRAFT LOADING DOOR

The present invention relates to aircraft and, more particularly, to a loading door opening mechanism for aircraft.

The general object of the present invention resides in the provision of very simple mechanism to open a door inwardly of fuselage of an aircraft while moving the door in a completely out-of-the-way position for clearing the loading opening of the aircraft for easy loading and unloading.

Another more specific object of the present invention resides in the provision of an aircraft loading door opening mechanism especially adapted for a door located in an overhanging portion of an aircraft fuselage, the mechanism being disposed entirely inside the fuselage so as not to form any outside obstruction in the aerodynamic configuration of the aircraft.

Another object of the invention resides in the provision of a door opening mechanism of the character described, which also serves as means to lock the door in closed position.

The foregoing and other objects of the present invention will become more apparent during the following disclosure and by referring to the drawings, in which:

FIG. 1 is a partial perspective view of the rear part of an aircraft provided with the loading door in accordance with the invention;

FIG. 2 is a partial longitudinal section of the aircraft fuselage provided with the loading opening and door in accordance with the invention in fully closed position;

FIG. 3 is a longitudinal partial section, similar to that of FIG. 2, showing the door in partially open position; and FIG. 4 is a similar longitudinal partial section showing the door in fully open position.

Referring now more particularly to the drawings in which like reference characters indicate like elements throughout, FIG. 1 shows the rear of a so-called channel wing aircraft, in which pusher propellers 1 are mounted in channels 2 of wings 3.

The aircraft shown has an upwardly extending tail section 4 forming a continuation of the fuselage 5.

A loading opening 6, of generally triangular shape with the apex at the top, is formed in the bottom wall 7 of the upwardly extending tail section 4.

Opening 6 defines a straight bottom edge 8 flush with the floor 9 of the fuselage 5 and curved side edges 10 converging towards the apex 11 of the opening 6. The side edges 10 are bevelled while the straight bottom edge 8 is of reduced width, compared to the side edges 10.

A door 12 is adapted to close the opening 6. Said door has the same substantially triangular shape and has bevelled side edges meeting at the apex 13 of the door. The bottom straight edge 14 of the door is perpendicular to the main plane of the door, but is provided with an inner shoulder 15 so as to abut against the inside of the straight bottom edge 8 of reduced thickness of the fuselage opening 6.

The door 12 is thus adapted to open inside the fuselage 5 and tail section 4, and in closed position the bevelled side edges of the door opening and the shoulder 15 of the door form a firm seating to firmly maintain the door in closed position against inward pressure.

The mechanism for opening the door and for locking the same in closed position comprises an inverted angular rigid member 16 defining a pair of straight legs 17 and 18 making an angle with respect to each other. The outer end of leg 17 is pivoted at 19 to the fuselage inside the same inwardly from the apex 11 of the door opening 6. The angular member is adapted to pivot about pivot connection 19 in a substantially vertical plane.

The outer end of leg 18 of angular member 16 is pivoted at 20 to the inside face of the door 12 at a point of said door spaced inwardly from the edge of the door, but above the center of gravity of the door.

Power-operated actuating means are provided for pivoting angular member 16. These actuating means preferably consist in a double-acting cylinder and piston unit 21 fed with hydraulic fluid under pressure, pivoted at one end at 22 to the fuselage 5 inside the latter and pivoted at 23 to the angular member 16, preferably at the junction of its two legs 17 and 18.

The pivots 19 and 20 of the angular member 16 to the fuselage and to the door are so arranged as to prevent transverse tilting movement of angular member 16.

The opening mechanism comprising the angular member 16 and hydraulic unit 21 may be a single assembly arranged in the median plane of the door and door opening. Two such assemblies could be provided equally spaced on each side of said median plane.

The mechanism operates as follows:

Starting from the fully closed position of the door shown in FIG. 2, it will be noted that the legs of angular member 16 form acute angles with the inside surfaces of the closed door and tail section 4. Retraction movement of the cylinder and piston unit 21 causes angular member 16 to pivot towards said hydraulic unit and pivot 20 starts to describe an arc of a circle about pivot 19. Therefore, the door 12 is first caused to pivot inwardly of the fuselage in its opening movement about its edge 14 remote from the V-shaped member 16 until the marginal zone of the door 12 overlapped by leg 18 of angular member 16, comes into abutment engagement with said leg 18, as shown in FIG. 3. Thus, the door opens first at the apex part thereof. Further retracting movement of the unit 21 causes the further opening of the door as a unit with angular member 16, the door being held in cantilevered position under the leg 18 of member 16. Thus, the door moves in a completely open position, as shown in FIG. 4, wherein all of its edges are spaced from the door opening. The door can take a fully open position substantially parallel to the floor 9. Thus, the door in its fully open position is easily accommodated within the inside of the fuselage and gives a much better access than if the door was to be hinged directly to the door opening edge. The door is maintained in open position due to its cantilevered arrangement with member 16. Reversing movement of unit 21 closes the door, and it will be noted that extension pressure exerted in the cylinder unit 21, exerts closing pressure on the door 12, to thereby cause the door to tightly close the opening 6 and to positively lock said door in closed position.

I claim:

1. In an aircraft having a fuselage with an outside door opening therein, a door arranged to seal said opening from the inside of said fuselage, linking means connecting said door to the aircraft fuselage, and actuating means connected to both the linking means and the aircraft fuselage for closing and opening said door, said linking means including an angular member having one end pivoted to said fuselage and the other end pivoted to said door about a transversely extending pivot axis spaced inwardly from the edge of said door and said angular member having a portion overlapping said door, said actuating means being arranged to pivot said member relative to said fuselage, said door is pivotally connected about said pivot axis and is arranged to be wholly suspended from said angular member, said pivot axis is located relative to said door to define a lighter door portion and an heavier door portion extending on opposite said of said pivot axis, said overlapping portion of said angular member overlying said lighter door portion, and the latter is constructed and arranged to abut said overlapping portion under the action of gravity on said heavier door portion when said door has been opened a predetermined amount.

2. In an aircraft as claimed in claim 1, wherein said opening is made in an inclined overhanging portion of said fuselage and said angular member is pivoted to said fuselage at a point adjacent the top edge of said opening and to said door at a point spaced inwardly from the top edge of said door and above the center of gravity of said door, said angular member is pivotable in a substantially vertical plane when the aircraft is in a level upright position, whereby the proximate marginal zone of said door will abut against said angular member and be maintained in said abutting position under the action of gravity in the open position of said door.

3. In an aircraft as claimed in claim 2, wherein said actuating means include a hydraulic cylinder and piston unit of the double-acting type pivotally connected to the apex of said angular member.

4. In an aircraft as claimed in claim 3, wherein said angular member and said hydraulic cylinder and piston unit are wholly located within said fuselage, and said door opens inwardly of said fuselage.